W. C. LIPE AND A. G. BOLSTER.
TIRE MOLD.
APPLICATION FILED MAR. 4, 1915.

1,320,399.

Patented Nov. 4, 1919.

Witnesses:
Chas. H. Young
Jane Glazier

Willard C. Lipe
Arthur G. Bolster
Inventors.
By Parsons & Bodell
Attorneys.

UNITED STATES PATENT OFFICE.

WILLARD C. LIPE AND ARTHUR G. BOLSTER, OF SYRACUSE, NEW YORK, ASSIGNORS TO THE FISK RUBBER CO., OF CHICOPEE FALLS, MASSACHUSETTS, A CORPORATION OF MASSACHUSETTS.

TIRE-MOLD.

1,320,399.

Specification of Letters Patent.

Patented Nov. 4, 1919.

Application filed March 4, 1915. Serial No. 11,996.

*To all whom it may concern:*

Be it known that we, WILLARD C. LIPE and ARTHUR G. BOLSTER, citizens of the United States, and residents of Syracuse, in the county of Onondaga and State of New York, have invented a certain new and useful Tire-Mold, of which the following is a specification.

Our invention has for its object a tire mold by which the designs of the treads of the tires can be readily varied; and the invention consists in the novel features of construction hereinafter set forth and claimed.

In describing this invention, reference is had to the accompanying drawings, in which like characters designate corresponding parts in all the views.

Figure 1:
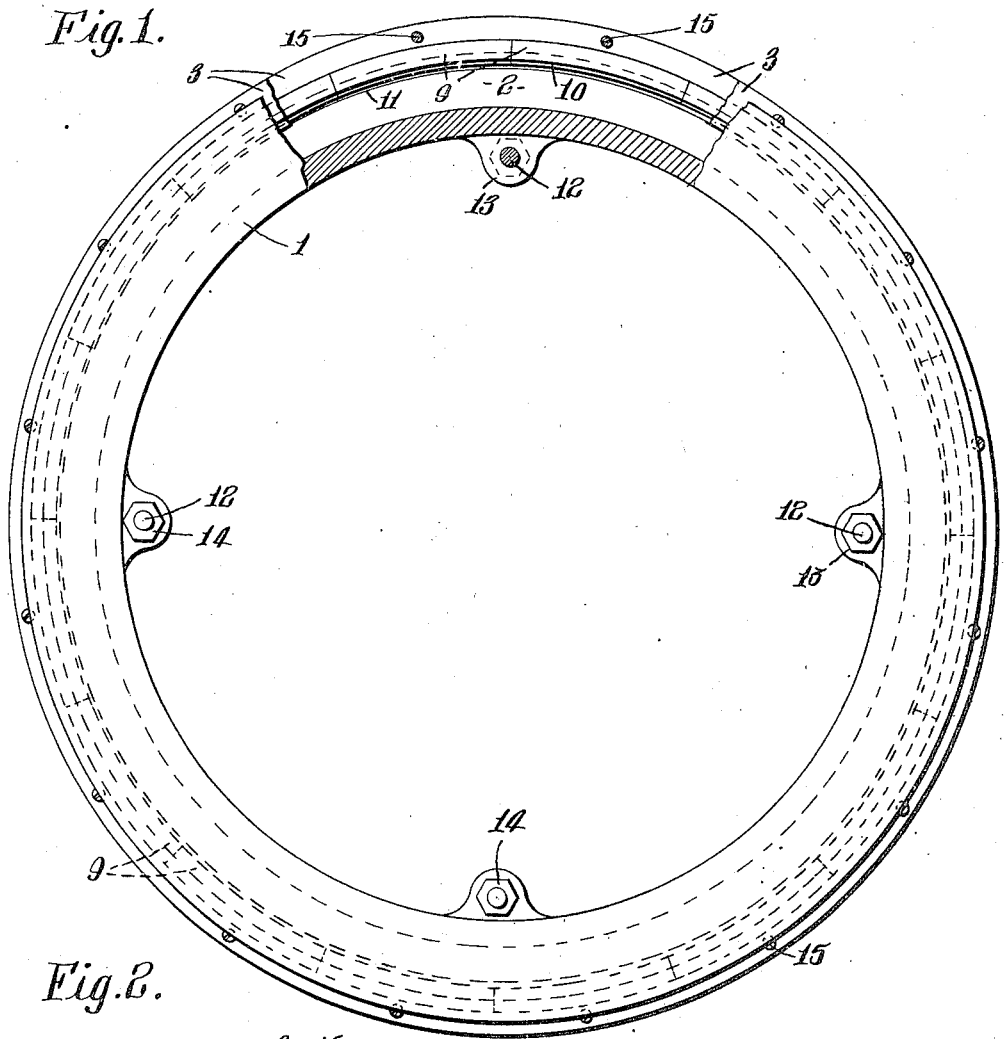
Figure 1 is a side elevation, partly in section, of a portion of our tire mold.
Figure 2:
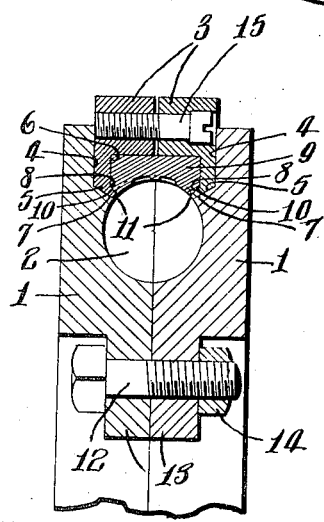
Fig. 2 is an enlarged cross-sectional view thereof.
Figure 3:
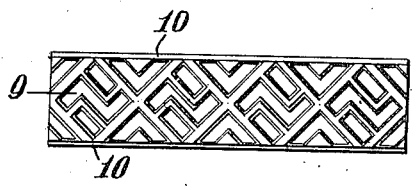
Fig. 3 is a face view of one of the matrix segments, the same being shown as rolled flat.

This tire mold comprises, generally, a sectional body formed with complemental recesses which together constitute the mold cavity, matrix holding means held between the body sections and located to the outside of the mold cavity, in radial directions, to hold matrix inserts in position to mold the tread of the tire, and matrix inserts detachably held between the holding means, said inserts being segments of a ring.

1 designates the sections of the body having recesses in their opposing faces which form the mold cavity 2. 3 are the matrix holding means which are composed of annular sections separable longitudinally and here shown as located in annular channels 4 formed in opposing faces of the body sections 1 and opening into the mold cavity 2, the channels 4 also usually opening through the peripheries of the sections 1. The channels 4 are formed with beveled or inclined sides 5 at their sides, that is, at the sides opening into the mold cavity 2. The matrix holder sections 3 are also formed with complemental channels 6 in their inner sides which open into the mold cavity 2, the channels 6 forming a recess for receiving the matrix inserts. The matrix holder sections are also formed with inclined faces 7 complemental to the inclined faces 5 of the channels 4, and the channels 6 are also formed with beveled faces on the side thereof opening into the cavity 2 forming a contracted mouth at 8 for the recess formed by the channels 6.

9 are the matrix inserts for molding the tread of the tire, each insert being a segment of a ring and located in portions of the channels 6 of both matrix holders 3. In other words, the segments are clamped between the holders 3 and each insert extends into the channels of both holders 3. Said inserts have beveled faces 10 on their front sides which engage the beveled faces 8 at the contracted mouth of the channels 4. Owing to the arrangement of the channels 4, the edge portions 11 on the side walls of said channels are exposed in the mold cavity 2.

The inserts are die cast on a core having substantially the same curvature as the tire to be molded, and hence the matrix faces thereof can be made much sharper than the matrix faces of the engraved rings, or sections of rings heretofore used in molding tires.

Heretofore, the matrix faces have been formed on a ring or segments of a ring of substantially the cross-sectional forms as the combined matrix holders and inserts, and hence these faces have been engraved. Hence to vary the design of the tread necessitates an entirely new and expensive ring, and furthermore, owing to the construction of the ring and the segments heretofore used, which ring and segments were not sectional and separable longitudinally, the designs of the engraved faces were limited to figures of certain angles, owing to the difficulty in stripping the tire mold from the tire.

By our construction a matrix insert of any design can be used, as owing to the separable holders and the inserts, there is no difficulty in stripping the mold from the tires.

By our invention, the change of the design of the tread of the tire is a simple and cheap operation as the inserts can be cheaply cast in a die.

The body sections are held together by suitable clamping means here shown as consisting of bolts 12 extending through alined lugs 13 located at intervals on the body sections 1 and nuts 14 screwing on the bolts.

The matrix holders are clamped together in order to hold the matrix inserts in any suitable manner, as by screws 15, extending through said holders at intervals.

What we claim is:—

1. A tire mold comprising a sectional body, the sections of which are formed with complemental recesses on their opposing sides, which recesses open through the peripheries of the sections, the inner portions of the recesses remote from the peripheries constituting the mold cavity, a matrix holder including opposing rings arranged between the body sections in the portions of the recesses between the mold cavity and the peripheries of the body sections, means for clamping said sections of the matrix holder together, matrix inserts clamped between the rings of the matrix holder with their faces exposed in the mold cavity, and means for clamping the body sections together, substantially as and for the purpose described.

2. A tire mold comprising a sectional body composed of separable side sections formed with complemental recesses which constitute the mold cavity and with channels in their opposing faces, the channels being located, in radial directions, to the outside of the mold cavity and opening thereinto, matrix holders including complemental sections extending into the channels respectively and separable longitudinally, the matrix holder sections being formed with complemental channels which open into the mold cavity, and matrix inserts held between the holder sections and located in the channels in position to mold the tread of the tire, each insert extending into the channels of both holder sections, substantially as and for the purpose set forth.

3. A tire mold comprising a sectional body composed of separable side sections formed with complemental recesses which constitute the mold cavity and with channels in their opposing faces, the channels being located, in radial directions, to the outside of the mold cavity and opening thereinto, a matrix holder including complemental sections extending into the channels respectively and separable longitudinally, the matrix holder sections being formed with complemental channels which open into the mold cavity, and matrix inserts held between the holder sections and located in the channels in position to mold the tread of the tire, each insert extending into the channels of both holder sections, said inserts being segments of a ring, substantially as and for the purpose described.

4. A tire mold comprising a sectional body composed of separable side sections formed with complemental recesses which constitute the mold cavity and with channels in their opposing faces, the channels being located, in radial directions, to the outside of the mold cavity and opening thereinto, a matrix holder including complemental sections extending into the channels respectively and separable longitudinally, the matrix holder sections being formed with complemental channels which open into the mold cavity, and matrix inserts held between the holder sections and located in the channels in position to mold the tread of the tire, each insert extending into the channels of both holder sections, said inserts being segments of a ring, and the matrix insert channels in said holders having their side walls contracted adjacent the mold cavity, and the matrix inserts fitting said channels, substantially as and for the purpose specified.

5. A tire mold comprising a body consisting of opposing side sections formed with complemental recesses which form the mold cavity, opposing annular matrix holding members interposed between the body sections to the outside of the mold cavity, in radial directions and having complemental channels therein which form a cavity for receiving matrix inserts, and matrix inserts held between matrix holders and consisting of segments of a ring located in the channels of the matrix holders with their matrix faces exposed in the mold cavity, means for clamping the side sections together, and means for clamping the matrix sections together, substantially as and for the purpose set forth.

In testimony whereof, we have signed our names in the presence of two attesting witnesses, respectively, at Syracuse, in the County of Onondaga, and State of New York, this 27th day of January 1915, and at Chicopee Falls, in the county of Hampden, and State of Massachusetts, this 5th day of January, 1915.

WILLARD C. LIPE.
    ARTHUR G. BOLSTER.

Witnesses to Lipe's signature:
 S. Davis,
 G. B. Pickard.

Witnesses to Bolster's signature:
 A. U. Saylor,
 C. W. Kirkpatrick.